United States Patent
Conlin et al.

(10) Patent No.: US 7,801,812 B2
(45) Date of Patent: Sep. 21, 2010

(54) METHODS AND SYSTEMS FOR CHARACTERISTIC LEVELING

(75) Inventors: Marie Conlin, Lawrenceville, GA (US); Sherry Harper, Dallas, GA (US); Luz Torrez, Fountain Valley, CA (US)

(73) Assignee: VantageScore Solutions, LLC, Stamford, CT (US)

( * ) Notice: Subject to any disclaimer, the term of this patent is extended or adjusted under 35 U.S.C. 154(b) by 0 days.

(21) Appl. No.: 11/685,070

(22) Filed: Mar. 12, 2007

(65) Prior Publication Data

US 2007/0282736 A1    Dec. 6, 2007

Related U.S. Application Data

(60) Provisional application No. 60/781,138, filed on Mar. 10, 2006, provisional application No. 60/781,052, filed on Mar. 10, 2006, provisional application No. 60/781,450, filed on Mar. 10, 2006.

(51) Int. Cl.
    *G06Q 40/00*    (2006.01)
(52) U.S. Cl. .......................... 705/38; 705/35
(58) Field of Classification Search ................... 705/38, 705/35
    See application file for complete search history.

(56) References Cited

U.S. PATENT DOCUMENTS

| | | | |
|---|---|---|---|
| 5,802,142 A | 9/1998 | Browne | |
| 6,202,053 B1 | 3/2001 | Christiansen et al. | 705/38 |
| 6,823,319 B1 | 11/2004 | Lynch et al. | |
| 7,120,599 B2 | 10/2006 | Keyes | 705/36 |
| 7,308,417 B1 | 12/2007 | Nathan | 705/10 |
| 7,314,166 B2 | 1/2008 | Anderson et al. | 235/380 |
| 2001/0039523 A1 | 11/2001 | Iwamoto | |
| 2001/0044766 A1 | 11/2001 | Keyes | 705/36 |
| 2002/0165839 A1 | 11/2002 | Taylor et al. | 382/225 |
| 2003/0046223 A1 | 3/2003 | Crawford et al. | |
| 2004/0044617 A1 | 3/2004 | Lu | |
| 2004/0199456 A1 | 10/2004 | Flint et al. | |
| 2005/0086579 A1* | 4/2005 | Leitner et al. | 715/500 |
| 2005/0102226 A1 | 5/2005 | Oppenheimer et al. | |
| 2005/0154664 A1* | 7/2005 | Guy et al. | 705/35 |

(Continued)

FOREIGN PATENT DOCUMENTS

JP    23016261    1/1999

(Continued)

OTHER PUBLICATIONS

Consumers Understood the Basics But Could Benefit From Targeted Educational Efforts. (Mar. 16). Finance Wire, Retrieved Jun. 15, 2010.*

(Continued)

*Primary Examiner*—Narayanswamy Subramanian
*Assistant Examiner*—Kito R Robinson
(74) *Attorney, Agent, or Firm*—Ballard Spahr LLP

(57) ABSTRACT

Characteristic normalization (or leveling) is a process that yields consistent and equitable characteristic definitions across multiple sources of credit information. This leveling ensures that when the same data is present for multiple credit sources, for example two or more credit reporting agencies, it is interpreted in the same manner, acknowledging that differences in the data itself may still be present.

21 Claims, 4 Drawing Sheets

U.S. PATENT DOCUMENTS

| | | | |
|---|---|---|---|
| 2005/0278246 | A1 | 12/2005 | Friedman et al. |
| 2005/0279824 | A1 | 12/2005 | Anderson et al. |
| 2006/0178971 | A1* | 8/2006 | Owen et al. .................... 705/35 |
| 2006/0241923 | A1 | 10/2006 | Xu et al. ....................... 703/22 |
| 2006/0242049 | A1 | 10/2006 | Haggerty et al. .............. 705/38 |
| 2006/0242051 | A1 | 10/2006 | Haggerty et al. .............. 705/38 |
| 2006/0282359 | A1 | 12/2006 | Nobili et al. .................. 705/38 |

FOREIGN PATENT DOCUMENTS

| | | |
|---|---|---|
| TW | 256569 | 6/2002 |
| WO | WO/2004/114160 | 12/2004 |
| WO | WO2006/099492 | 9/2006 |

OTHER PUBLICATIONS

U.S. Appl. No. 11/685,061, filed Mar. 12, 2007, Inventor Morris et al., Tittle: Methods and Systems for Segmentation Using Multiple Dependent Variables, Response after Non-Final Action, May 26, 2010.

U.S. Appl. No. 11/685,061, filed Mar. 12, 2007, Inventor Morris et al., Tittle: Methods and Systems for Segmentation Using Multiple Dependent Variables, Mail Non-Final Rejection, Jan. 28, 2010.

U.S. Appl. No. 11/685,061, filed Mar. 12, 2007, Inventor Morris et al., Tittle: Methods and Systems for Segmentation Using Multiple Dependent Variables, Response after Final Action, Nov. 11, 2009.

U.S. Appl. No. 11/685,061, filed Mar. 12, 2007, Inventor Morris et al., Tittle: Methods and Systems for Segmentation Using Multiple Dependent Variables, Mail Final Rejection, Aug. 19, 2009.

U.S. Appl. No. 11/685,061, filed Mar. 12, 2007, Inventor Morris et al., Tittle: Methods and Systems for Segmentation Using Multiple Dependent Variables, Response after Non-Final Action, Apr. 17, 2009.

U.S. Appl. No. 11/685,061, filed Mar. 12, 2007, Inventor Morris et al., Tittle: Methods and Systems for Segmentation Using Multiple Dependent Variables, Mail Non-Final Rejection, Dec. 19, 2008.

U.S. Appl. No. 11/685,066, filed Mar. 12, 2007, Inventor Morris et al., Tittle: Methods and Systems for Multi-Credit Reporting Agency Data Modeling, Response after Non-Final Action, Apr. 20, 2010.

U.S. Appl. No. 11/685,066, filed Mar. 12, 2007, Inventor Morris et al., Tittle: Methods and Systems for Multi-Credit Reporting Agency Data Modeling, Mail Non-Final Rejection, Jan. 21, 2010.

U.S. Appl. No. 11/685,066, filed Mar. 12, 2007, Inventor Morris et al., Tittle: Methods and Systems for Multi-Credit Reporting Agency Data Modeling, Response after Non-Final Action, Oct. 27, 2009.

U.S. Appl. No. 11/685,066, filed Mar. 12, 2007, Inventor Morris et al., Tittle: Methods and Systems for Multi-Credit Reporting Agency Data Modeling, Mail Non-Final Rejection, May 27, 2009.

U.S. Appl. No. 11/685,066, filed Mar. 12, 2007, Inventor Morris et al., Tittle: Methods and Systems for Multi-Credit Reporting Agency Data Modeling, Response after Non-Final Action, Feb. 24, 2009.

U.S. Appl. No. 11/685,066, filed Mar. 12, 2007, Inventor Morris et al., Tittle: Methods and Systems for Multi-Credit Reporting Agency Data Modeling, Mail Non-Final Rejection, Oct. 16, 2008.

* cited by examiner

METHODS AND SYSTEMS FOR CHARACTERISTIC LEVELING

CROSS REFERENCE TO RELATED PATENT APPLICATIONS

This application claims priority to U.S. Provisional Application No. 60/781,138 filed Mar. 10, 2006, U.S. Provisional Application No. 60/781,052 filed Mar. 10, 2006, and U.S. Provisional Application No. 60/781,450 filed Mar. 10, 2006 herein incorporated by reference in their entireties. Related U.S. Utility application Ser. No. 11/685,066, filed Mar. 12, 2007, by Morris, et al., titled "Methods and Systems for Multi-Credit Reporting Agency Data Modeling" and U.S. Utility application Ser. No. 11/685,061, filed Mar. 12, 2007, by Morris, et al., titled "Methods and Systems for Segmentation Using Multiple Dependent Variables" are herein incorporated by reference in their entireties.

BACKGROUND OF THE INVENTION

Credit characteristics are a major foundation of consumer credit decisioning. Inconsistent or inequitable definitions in characteristics across Credit Reporting Agencies (CRAs) results in vastly different risk perspectives when decisioning. In particular, this is true for the majority of consumers whose credit profile is housed by more than one CRA.

It is a common practice that a CRA independently defines characteristics that take advantage of their own credit reporting structure. If required, the CRA then takes the characteristic definitions and makes the best attempt to "fit" data from another CRA to those definitions. Since the characteristics are written to maximize use of the information from the CRA's own data structure, it may prove challenging (or even impossible) to apply the definitions to another CRA's data. Further, while one CRA may have peripheral knowledge of the others' data, the CRA does not have access to all the detailed knowledge that an insider to the other organization would have. This detailed knowledge includes past updates (with timing) to the reporting structure, plans for changes to the reporting structure, detailed definitions and/or intended uses for data elements, etc.

It is not uncommon that consumer credit grantors have their market share of credit profile requests spread across multiple credit reporting agencies. Independent of the agency from which the credit information originated, it is desirable that grantors have the ability to make uniform credit decisions.

SUMMARY OF THE INVENTION

Characteristic normalization (or leveling) is a process that yields consistent and equitable characteristic definitions across multiple sources of credit data. This leveling ensures that when the same data is present for multiple credit sources, for example two or more CRAs, it is interpreted in the same manner, acknowledging that differences in the data itself may still be present.

For consumer credit grantors, using normalized characteristics and characteristic definitions allows them to have a more consistent "picture" of a consumer's credit payment behavior, regardless of which CRA's data is being used. Credit grantors can have more confidence that they are making a consistent credit decision when applying the same characteristics to different sets of data. Normalized characteristics are also beneficial in helping credit grantors avoid large investments to maintain different credit decisioning policies for each CRA. For example, if a credit grantor were to retain different credit policies based on the CRA supplying the profile, they would need to invest resources in programming and maintaining the different versions of policies, as well as training personnel to use the different versions of policies, rather than one set.

For the consumer seeking credit, they can be assured that no matter which agency provides their credit profile, they are getting a uniform representation of their credit history. This is very important in a time when educated consumers are conscientiously making inquiries to all three CRAs for copies of their credit profiles and have the ability to compare the reported information.

With ever-increasing consumer awareness of "credit scoring," it is important that steps be taken to make consistent credit decisions. Provided are methods and systems for characteristic normalization that produces equitable and consistent characteristic definitions, which creates a more equitable and consistent score and characteristic results for the same consumer.

Additional advantages of the invention will be set forth in part in the description which follows or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION OF THE INVENTION

Figure 1:
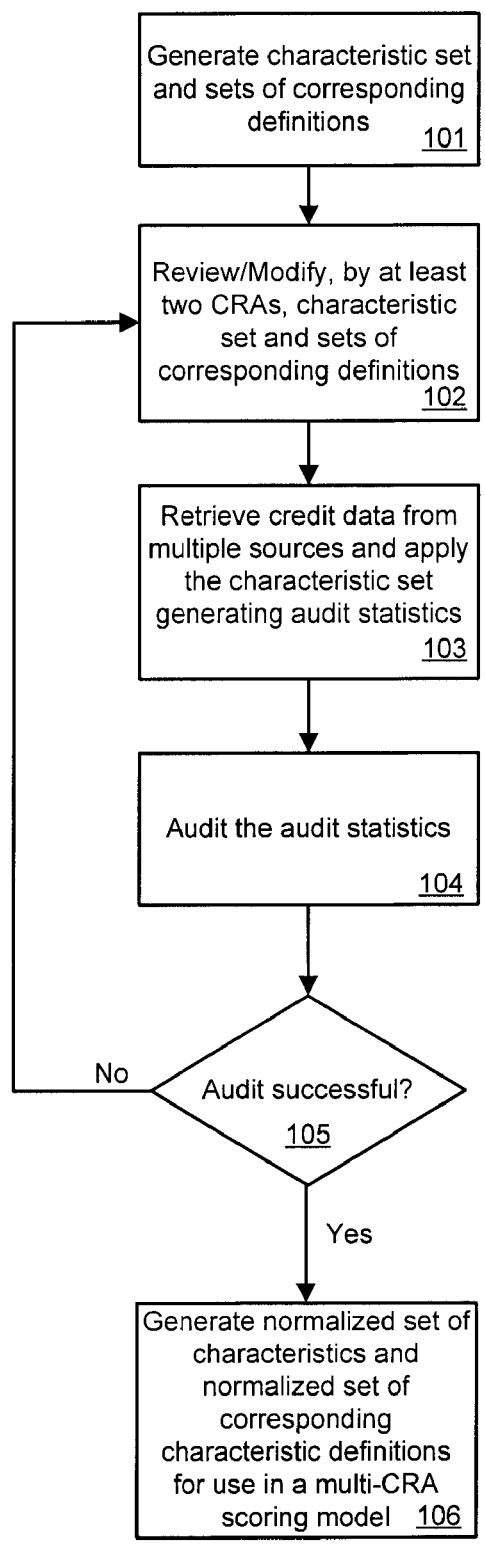
FIG. 1 is a flowchart illustrating an exemplary method for characteristic leveling.

Before the present methods and systems are disclosed and described, it is to be understood that this invention is not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present invention may be understood more readily by reference to the following detailed description of preferred embodiments of the invention and the Examples included therein and to the Figures and their previous and following description.

I. Method

True characteristic normalization is a process that involves a cooperative effort by "credit data experts" from each of the involved CRAs. These experts understand the scoring objectives and underlying philosophies for the desired set of characteristics. A set of characteristics and characteristic definitions can be generated that most align the definitions for all the CRAs to reflect the objectives. A characteristic can be a data element that summarizes a particular characteristic of a consumer's credit behavior as derived from a credit report (i.e. Total number of open and closed bankcard trades). A characteristic definition can be a statement that describes the meaning of the characteristic through components (e.g. filters to be used, field length, default conditions) needed to calculate the characteristic values on each CRA's credit file. Filters can be comprehensive descriptions that are utilized in characteristic definitions (i.e. BNKCARD=specific elements that identify Bankcard at each CRA). Filters classify data elements from a credit report into specific categories such that they may be used in any combination to create characteristics.

Characteristics can be composed of a set of building blocks (filters) that define basic concepts used in credit decisioning. These concepts include, but are not limited to, industry types (e.g. banking, finance, retail), payment behavior (e.g. 30-day rating, presence of bankruptcy, satisfactory rating), credit inquiries initiated by the consumer, and the like. Characteristics can be defined using these filters. For example, a characteristic "Total Number of 30-Day Ratings on Retail Accounts" would use the retail and 30-day rating filters.

FIG. 1 illustrates an exemplary embodiment of the present invention. At block 101, a set of characteristics can be generated. The characteristics can be generated from pre-existing characteristics. These characteristics can also be generated through communications between credit data experts. The corresponding definition for each characteristic can be retrieved from each CRA to generate multiple sets of characteristic definitions, at least one set per CRA. If a new characteristic is generated, a corresponding characteristic definition can be generated.

The set of characteristics can be generated to accomplish an objective for the characteristic set, such as use with pre-screen criteria, account management criteria, credit risk modeling, and the like. At block 102 the characteristic set can be reviewed and modified in light of the objective and the likelihood of leveling success. Also at block 102, the set of characteristic definitions from each CRA can be reviewed and modified if necessary based on the data elements available for each CRA. The review can be performed by two or more CRAs working collaboratively.

If not retrieved electronically, the characteristic set and the sets of characteristic definitions are programmed (coded). At block 103, each CRA can retrieve credit data (credit data profiles) for a selected sample of consumers (in an anonymous manner), applying the characteristic set and that CRA's respective characteristic definitions to those profiles. The result can be one or more audit statistics for each credit data profile, cumulative audit statistics for the credit data profiles from each CRA, overall statistics for all the CRAs, and the like.

Each CRA can generate summary characteristic and filter statistics (e.g. minimum, maximum, mean, median, and quantile values). The statistic values for both individual filters and characteristics for individual consumer profiles can be compared within a CRA, between the CRAs, and between iterations of statistic generation. Since the filters summarize a consumer's credit data at a component level rather than at an overall profile level additional statistics can be generated to audit at the consumer level.

Table 1 provides exemplary characteristic statistic. By way of example, four characteristics are provided. For each characteristic, the mean value of the credit data is provided from each CRA.

TABLE 1

| CHARACTERISTIC | CRA 1 MEAN | CRA2 MEAN | CRA3 MEAN |
|---|---|---|---|
| Total number of auto trades ever derogatory | 0.19 | 0.19 | 0.19 |
| Total number of open bankcard trades reported within 6 months | 2.72 | 2.75 | 2.76 |
| Total number of open and closed bankcard trades | 4.01 | 3.99 | 4.05 |
| Total number of auto trades opened within 24 months | 1 | 0.98 | 1.11 |

Table 2 provides exemplary filter statistics. By way of example, four filters are provided. Auto can represent finances automobiles, bankcard can represent open financial accounts, closed can represent closed financial account, and charge off can represent financial accounts that have been "written off" by a creditor. For each filter, the percentage of consumers from the credit data matching that filter is provided, as is the corresponding number of consumers that make up that percentage, for each CRA.

TABLE 2

| FILTER | CRA 1 % | CAR 1 # | CRA 2 % | CRA 2 # | CRA 3 % | CRA 3 # |
|---|---|---|---|---|---|---|
| Auto | 64.29 | 101112 | 63.25 | 103332 | 66.19 | 120001 |
| Bankcard | 72.22 | 152010 | 71.01 | 151669 | 72.29 | 150216 |
| Closed | 51.73 | 99437 | 51.79 | 99997 | 51.21 | 98661 |
| Charge Off | 7.25 | 12107 | 6.99 | 11999 | 8.21 | 13567 |

At block 104, the audit statistics can be audited. The audit process is described in more detail below in FIG. 3. At block 105, a check can be performed to determine if the audit was successful. If the result of the audit was that the audit statistics returned from the CRAs based on the characteristic set and the sets of characteristic definitions provides substantially consistent results, then the audit was successful. If, at block 105, an audit has been previously performed, the statistics generated from the previous audit can be compared to the statistics generated during the current audit. Statistics can be compared between CRAs and within CRAs. A successful audit is indicated when statistics are substantially consistent. For example, values generated for a statistic that represents total balances on open revolving traits can be deemed to be substantially consistent when the difference in values is from about 0% to about 5%. Similarly, values generated for a statistic that represents presence of bankruptcy public record can be deemed to be substantially consistent when the difference in values is from about 0 to about 0.1. Another example includes values generated for a statistic that represents total number of open trades can be deemed to be substantially consistent when the difference in values is from about 0 to about 100,000. One skilled in the art will recognize that there are various statistics that can be generated and as such, what defines substantially consistent values can vary depending on the statistic generated.

Then, at block 106, a normalized set of characteristic definitions corresponding to the set of characteristics can be generated. The normalized set of characteristic definitions can be translated to apply to each CRA's unique data management system for use in a multi-CRA scoring model.

If, however, at block 105, the audit was not successful, then the audit statistics based on the characteristic set and the sets of characteristic definitions did not provide substantially consistent results. Block 102 can be returned to and the process repeated until the audit is successful.

Based on the results of the filter and characteristic comparison between CRAs, the characteristic set and sets of characteristic definitions may be modified to accommodate scenarios not addressed by the original characteristic set and sets of characteristic definitions but that are present in the data. More importantly, the characteristic set and sets of characteristic definitions may be modified to further minimize differences between the audit statistics provided by the CRAs, while maintaining the agreement in credit perspectives. Summary filter and characteristic statistics can be compared to previously generated summary filter and characteristic statistics.

The auditing may require several iterations before a final set of characteristics and a final set of normalized characteristic definitions are generated.

As an example of this process, it can be determined that a filter for "trade" was needed since many of the characteristics calculate values on the trade set of the credit profile. Since there are differences between CRAs in their display of "trade," normalization must occur. By way of example, the difference can be that one CRA displays their external collections as trades while the other two CRAs display them in a segment separate from trade. In order to normalize the trade definition, it can be determined that external collections should be excluded in the trade definition for all CRAs.

Furthermore, it can be determined that factoring company data should be included as external collections and thus excluded from the trade filter definition. The result of this normalization of the trade filter translates into CRA specific characteristic definitions for the trade filter which contain codes unique to each CRA, but provide a consistent end result across them. Exemplary codes are described in Table 3.

By way of example, in Table 4 the characteristic "Age, in months, of oldest trade" uses the trade filter that has been normalized. All other aspects of the characteristic definition, the logic used, the length of the field, the default logic handling, etc., are consistent between the CRAs so that the characteristics yield equitable results when implemented, baring differences in the core data on the credit profile at each CRA.

TABLE 4

Age, in months, of oldest trade
SAS Label: AGE OF OLDEST TRADE
Logic: TRADE and (OPEN or CLOSED or STATIC)
and MONTHS-OPEN <=9998

| | |
|---|---|
| Computation: MAX | Operand1: MONTHS-OPEN |
| Length: 4 | Operand2: |
| Default1: 9999 | Default1 Condition: TR6001 = 0 and |
| Default2: | TR0102 = 0 |
| Default3: | Default2 Condition: |
| | Default3 Condition: |

Figure 2:
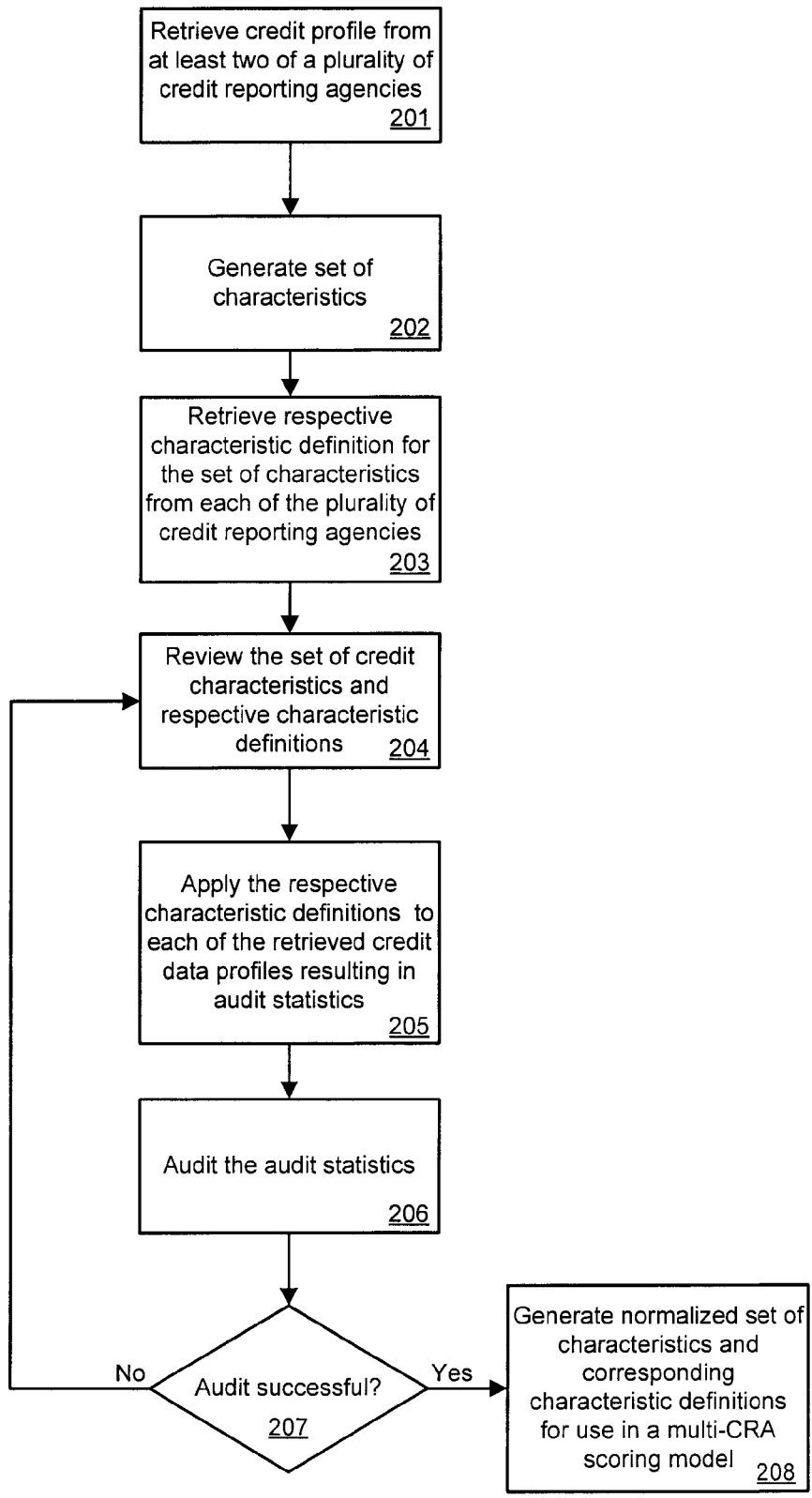
FIG. 2 is a flowchart illustrating an exemplary method for characteristic leveling.

FIG. 2 illustrates another exemplary method for leveling a set of credit data characteristics. At block 201, a credit data profile can be retrieved for at least one consumer, wherein retrieving a credit data profile is performed by at least two of a plurality of credit reporting agencies resulting in at least two credit data profiles for the at least one consumer. Then at block 202, a set of characteristics can be generated. At block 203, a respective characteristic definition can be retrieved from each of the at least two of the plurality of credit reporting agencies for each credit characteristic in the set of credit characteristics. At block 204, the set of credit characteristics and respective characteristic definitions can be reviewed, wherein reviewing is performed by the at least two of the plurality of credit reporting agencies. Reviewing the set of credit characteristics and respective characteristic definitions can comprise modifying one or more of the respective characteristic definitions.

At block 205, the respective characteristic definitions can be applied to each of the retrieved credit data profiles, generating audit statistics associated with each credit data profile. Generating audit statistics can comprise generating a first set of audit statistics based on a first application of the respective characteristic definitions to each of the retrieved credit data profiles. Generating audit statistics can also comprise generating a second set of audit statistics based on a second application of the respective characteristic definitions (original or modified) to each of the retrieved credit data profiles.

At block 206, the audit statistics can be audited. Auditing the audit statistics can comprise receiving first audit statistics and comparing the first audit statistics between different credit reporting agencies. Comparing the first audit statistics

TABLE 3

| FILTER | DEFINITION FOR CRA 1 | DEFINITION FOR CRA 2 | DEFINITION FOR CRA 3 |
|---|---|---|---|
| TRADE Excludes external collection trades and factoring company trades | TR-PT and (Exclude IND-TYPE = FY, YA, YC) | Id = 07 and Status >01 and (Exclude KOB = YA, YC, YL, YZ, ZY Or Enhanced Type = 48, 0C) | TR-TR and (Exclude IND-CODE = Y or Loan Type = FC) | can comprise modifying at least one of the respective characteristic definitions. The method can further comprise receiving second audit statistics based on the at least one modified characteristic definition and comparing the first audit statistics with the second audit statistics. The method can further comprise comparing the second audit statistics between different credit reporting agencies. Auditing the audit statistics can further comprises retrieving and examining one or more credit profiles from the credit data. The examination can be used to determine the cause of similarities or differences between the audit statistics.

Then at block 207, it can be determined whether the audit was successful. Auditing the audit statistics can be deemed successful when the first audit statistics are substantially consistent with the second audit statistics. Auditing the audit statistics can also be deemed successful when the first audit statistics are substantially consistent between different credit reporting agencies. Substantially consistent can be determined based on the statistic generated. If the audit was successful, a normalized set of credit characteristics and characteristic definitions can be generated from the set of credit characteristics and respective characteristic definitions at block 208. The normalized set of characteristics and corresponding normalized set of characteristic definitions can be used in a multi-CRA scoring model. If the audit was not successful, the method can return to block 204.

Figure 3:
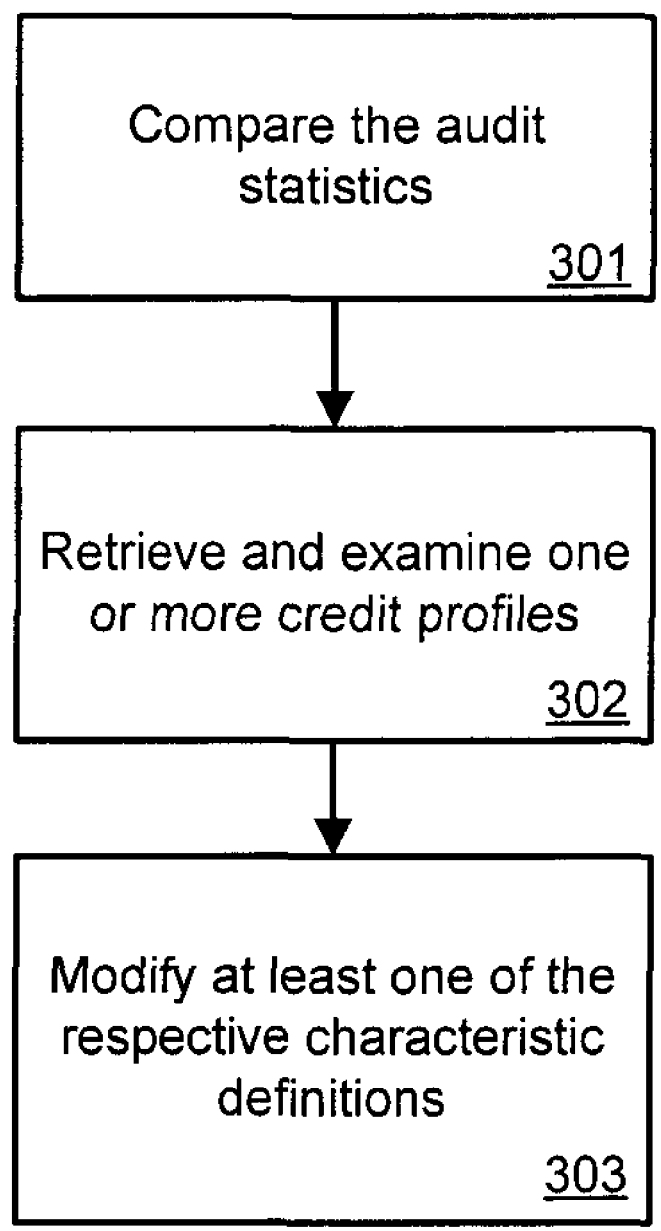
FIG. 3 is a flowchart illustrating an exemplary method for credit data auditing.

FIG. 3 illustrates steps in an exemplary audit process. At block 301, the audit statistics are compared, and similarities and differences noted. At block 302, one or more credit profiles can be retrieved from the credit data and examined. The examination can be used to determine the cause of similarities or differences between the audit statistics. Then, at block 303, the similarities and differences can be used to modify the respective characteristic definitions so as to provide consistent data retrieval results across multiple CRAs. The modification can be made and approved by at least two CRAs working collaboratively.

II. System

Figure 4:
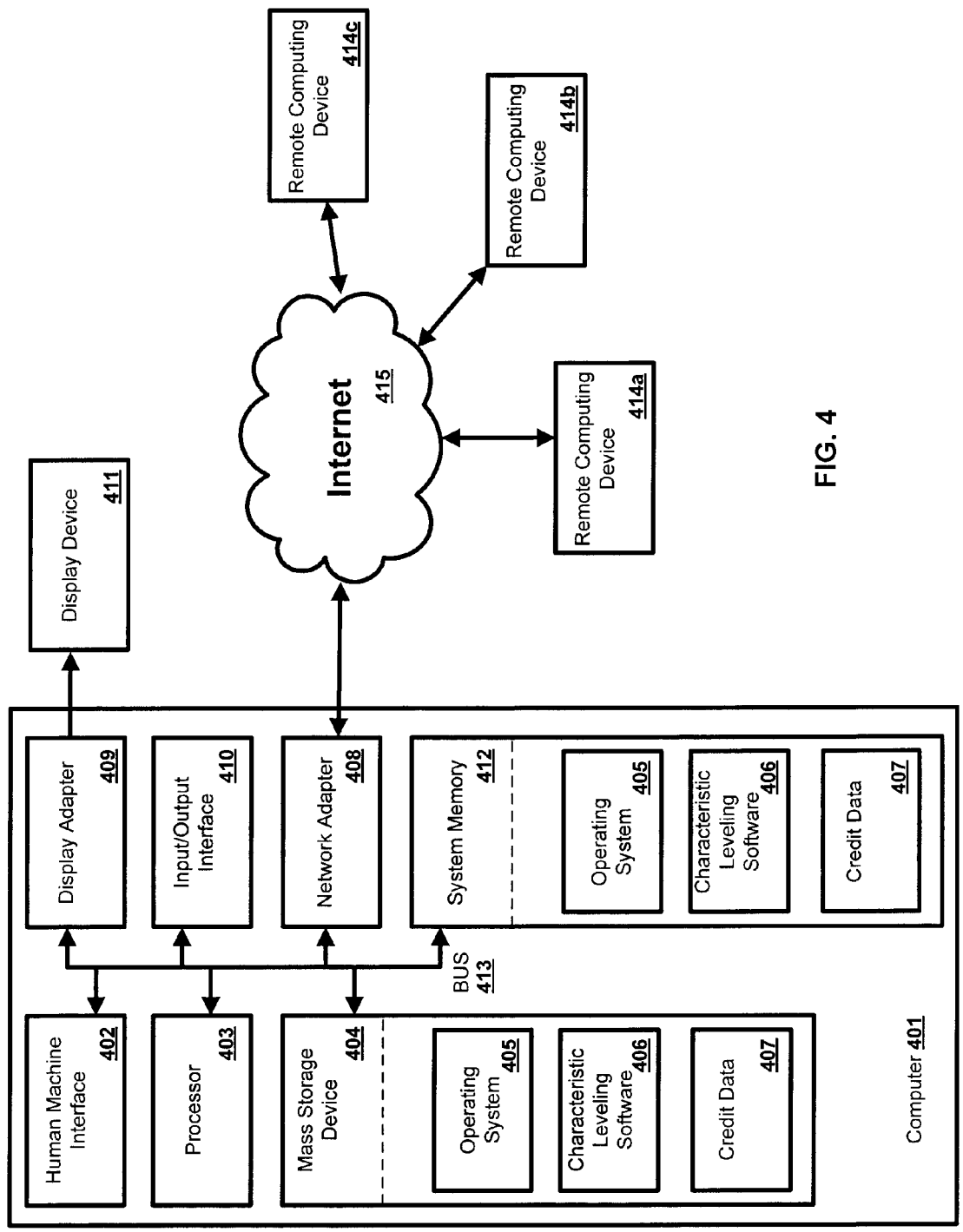
FIG. 4 is an exemplary operating environment.

FIG. 4 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The method can be operational with numerous other general purpose or special purpose computing system environments or configurations. Examples of well known computing systems, environments, and/or configurations that may be suitable for use with the system and method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The processing of the disclosed method can be performed by software components. The disclosed method may be described in the general context of computer-executable instructions, such as program modules, being executed by one or more computers or other devices. Generally, program modules include computer code, routines, programs, objects, components, data structures, etc. that perform particular tasks or implement particular abstract data types. The disclosed method may also be practiced in grid-based and distributed computing environments where tasks are performed by remote processing devices that are linked through a communications network. In a distributed computing environment, program modules may be located in both local and remote computer storage media including memory storage devices. The method may be practiced utilizing firmware configured to perform the methods disclosed herein in conjunction with system hardware.

The methods and systems of the present invention can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The method disclosed herein can be implemented via a general-purpose computing device in the form of a computer 401. The components of the computer 401 can include, but are not limited to, one or more processors or processing units 403, a system memory 412, and a system bus 413 that couples various system components including the processor 403 to the system memory 412.

The system bus 413 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 413, and all buses specified in this description can also be implemented over a wired or wireless network connection and each of the subsystems, including the processor 403, a mass storage device 404, an operating system 405, characteristic leveling software 406, credit data 407, a network adapter 408, system memory 412, an Input/Output Interface 410, a display adapter 409, a display device 411, and a human machine interface 402, can be contained within one or more remote computing devices 414a,b,c at physically separate locations, connected through buses of this form, in effect implementing a fully distributed system.

The computer 401 typically includes a variety of computer readable media. Such media can be any available media that is accessible by the computer 401 and includes both volatile and non-volatile media, removable and non-removable media. The system memory 412 includes computer readable media in the form of volatile memory, such as random access memory (RAM), and/or non-volatile memory, such as read only memory (ROM). The system memory 412 typically contains data such as credit data 407 and/or program modules such as operating system 405 and characteristic leveling software 406 that are immediately accessible to and/or are presently operated on by the processing unit 403.

The computer 401 may also include other removable/non-removable, volatile/non-volatile computer storage media. By way of example, FIG. 4 illustrates a mass storage device 404 which can provide non-volatile storage of computer code, computer readable instructions, data structures, program modules, and other data for the computer 401. For example, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 404, including by way of example, an operating system 405 and characteristic leveling software 406. Each of the operating system 405 and characteristic leveling software 406 (or some combination thereof) may include elements of the programming and the characteristic leveling software 406. Credit data 407 can also be stored on the mass storage device 404. Credit data 407 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems, such as across multiple CRAs.

A user can enter commands and information into the computer 401 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 403 via a human machine interface 402 that is coupled to the system bus 413, but may be connected by other interface and bus structures, such as a parallel port, game port, or a universal serial bus (USB).

A display device 411 can also be connected to the system bus 413 via an interface, such as a display adapter 409. A computer 401 can have more than one display adapter 409 and a computer 401 can have more than one display device 411. For example, a display device can be a monitor, an LCD (Liquid Crystal Display), or a projector. In addition to the display device 411, other output peripheral devices can include components such as speakers (not shown) and a printer (not shown) which can be connected to the computer 401 via Input/Output Interface 410.

The computer 401 can operate in a networked environment using logical connections to one or more remote computing devices 414*a,b,c*. By way of example, a remote computing device can be a personal computer, portable computer, a server, a router, a network computer, a peer device or other common network node, and so on. Logical connections between the computer 401 and a remote computing device 414*a,b,c* can be made via a local area network (LAN) and a general wide area network (WAN). Such network connections can be through a network adapter 408. A network adapter 408 can be implemented in both wired and wireless environments. Such networking environments are commonplace in offices, enterprise-wide computer networks, intranets, and the Internet 415.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of application software, characteristic leveling software 406, may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While this invention has been described in connection with preferred embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A computer implemented method for leveling credit characteristics comprising:
   (a) retrieving by a computer a credit data profile for at least one consumer, wherein retrieving a credit data profile is performed by at least two of a plurality of credit reporting agencies resulting in at least two credit data profiles for the at least one consumer, and wherein the credit data profile represents a credit history for the at least one consumer;
   (b) generating by the computer a set of credit characteristics, wherein the set of credit characteristics represent a set of data elements that summarize a particular characteristic of a consumer's credit behavior, wherein generating a set of credit characteristics is performed by the at least two of the plurality of credit reporting agencies;
   (c) retrieving by the computer a respective characteristic definition from each of the at least two of the plurality of credit reporting agencies for each credit characteristic in the set of credit characteristics, wherein the respective characteristic definition is a statement that describes a meaning of the characteristic through components;
   (d) reviewing by the computer the set of credit characteristics and respective characteristic definitions, wherein reviewing is performed by the at least two of the plurality of credit reporting agencies;
   (e) applying by the computer the respective characteristic definitions to each of the retrieved credit data profiles, generating by the computer audit statistics associated with each credit data profile;

(f) auditing by the computer the audit statistics;

(g) determining by the computer whether the step of auditing was successful;

(h) if the step of auditing was successful, generating by the computer a normalized set of credit characteristics and characteristic definitions from the set of credit characteristics and respective characteristic definitions; and (i) if the step of auditing was not successful, modifying by the computer one or more of the respective characteristic definitions and repeating by the computer steps (d), (e), and (f) until the step of auditing the audit statistics is successful.

2. The method of claim 1, wherein the step of generating by the computer audit statistics further comprises:

generating first audit statistics; and comparing the first audit statistics between different credit reporting agencies.

3. The method of claim 2, wherein the step of comparing the first audit statistics comprises modifying at least one of the respective characteristic definitions.

4. The method of claim 3, further comprising:

generating second audit statistics based on the at least one modified characteristic definition; and comparing the first audit statistics with the second audit statistics.

5. The method of claim 4, further comprising:

comparing the second audit statistics between different credit reporting agencies.

6. The method of claim 4, wherein the step of auditing the audit statistics is successful when the first audit statistics are substantially consistent with the second audit statistics.

7. The method of claim 4, wherein the step of auditing the audit statistics is successful when the first audit statistics are substantially consistent between different credit reporting agencies.

8. A system for leveling credit characteristics comprising:

a memory configured for storing credit data profiles and credit reports;

a processor, coupled to the memory, wherein the processor is configured to perform the steps of:

(a) retrieving a credit data profile for at least one consumer, wherein retrieving a credit data profile is performed by at least two of a plurality of credit reporting agencies resulting in at least two credit data profiles for the at least one consumer, and wherein the credit data profile represents a credit history for the at least one consumer;

(b) generating a set of credit characteristics, wherein the set of credit characteristics represent a set of data elements that summarize a particular characteristic of a consumer's credit behavior, wherein generating a set of credit characteristics is performed by the at least two of the plurality of credit reporting agencies;

(c) retrieving a respective characteristic definition from each of the at least two of the plurality of credit reporting agencies for each credit characteristic in the set of credit characteristics, wherein the respective characteristic definition is a statement that describes a meaning of the characteristic through components;

(d) reviewing the set of credit characteristics and respective characteristic definitions, wherein reviewing is performed by the at least two of the plurality of credit reporting agencies;

(e) applying the respective characteristic definitions to each of the retrieved credit data profiles, generating audit statistics associated with each credit data profile;

(f) auditing the audit statistics;

(g) determining whether the step of auditing was successful;

(h) if the step of auditing was successful, generating a normalized set of credit characteristics and characteristic definitions from the set of credit characteristics and respective characteristic definitions; and (i) if the step of auditing was not successful, modifying one or more of the respective characteristic definitions and repeating steps (d), (e), and (f) until the step of auditing the audit statistics is successful.

9. The system of claim 8, wherein the step of generating the audit statistics further comprises:

generating first audit statistics; and comparing the first audit statistics between different credit reporting agencies.

10. The system of claim 9, wherein the step of comparing the first audit statistics comprises modifying at least one of the respective characteristic definitions.

11. The system of claim 10, further comprising:

generating second audit statistics based on the at least one modified characteristic definition; and comparing the first audit statistics with the second audit statistics.

12. The system of claim 11, further comprising:

comparing the second audit statistics between different credit reporting agencies.

13. The system of claim 11, wherein the step of auditing the audit statistics is successful when the first audit statistics are substantially consistent with the second audit statistics.

14. The system of claim 11, wherein the step of auditing the audit statistics is successful when the first audit statistics are substantially consistent between different credit reporting agencies.

15. A non-transitory computer-readable storage medium with computer-executable instructions embodied thereon for leveling credit characteristics comprising:

(a) retrieving a credit data profile for at least one consumer, wherein retrieving a credit data profile is performed by at least two of a plurality of credit reporting agencies resulting in at least two credit data profiles for the at least one consumer, and wherein the credit data profile represents a credit history for the at least one consumer;

(b) generating a set of credit characteristics, wherein the set of credit characteristics represent a set of data elements that summarize a particular characteristic of a consumers credit behavior, wherein generating a set of credit characteristics is performed by the at least two of the plurality of credit reporting agencies;

(c) retrieving a respective characteristic definition from each of the at least two of the plurality of credit reporting agencies for each credit characteristic in the set of credit characteristics, wherein the respective characteristic definition is a statement that describes a meaning of the characteristic through components;

(d) reviewing the set of credit characteristics and respective characteristic definitions, wherein reviewing is performed by the at least two of the plurality of credit reporting agencies;

(e) applying the respective characteristic definitions to each of the retrieved credit data profiles, generating audit statistics associated with each credit data profile;

(f) auditing the audit statistics;

(g) determining whether the step of auditing was successful;

(h) if the step of auditing was successful, generating a normalized set of credit characteristics and characteristic definitions from the set of credit characteristics and respective characteristic definitions; and (i) if the step of auditing was not successful, modifying one or more of the respective characteristic definitions and repeating steps (d), (e), and (f) until the step of auditing the audit statistics is successful.

16. The computer readable medium of claim 15, wherein the step of generating audit statistics further comprises:

generating first audit statistics; and comparing the first audit statistics for credit data profiles retrieved between different credit reporting agencies.

17. The computer readable medium of claim 16, wherein the step of comparing the first audit statistics comprises modifying at least one of the respective characteristic definitions.

18. The computer readable medium of claim 17, further comprising:

generating second audit statistics based on the at least one modified characteristic definition; and comparing the first audit statistics with the second audit statistics.

19. The computer readable medium of claim 18, further comprising:

comparing the second audit statistics between different credit reporting agencies.

20. The computer readable medium of claim 18, wherein the step of auditing the audit statistics is successful when the first audit statistics are substantially consistent with the second audit statistics.

21. The computer readable medium of claim 18, wherein the step of auditing the audit statistics is successful when the first audit statistics are substantially consistent between different credit reporting agencies.

* * * * *